United States Patent Office 3,338,840
Patented Aug. 29, 1967

3,338,840
URANIUM MONONITRIDE-SODIUM PASTE
NUCLEAR FUEL
Paul A. Nelson, Wheaton, and Martin G. Chasanov, Homewood, Ill., assignors to the United States of America as represented by the United States Atomic Energy Commission
No Drawing. Original application Aug. 6, 1965, Ser. No. 477,981, now Patent No. 3,287,093, dated Nov. 22, 1966. Divided and this application June 9, 1966, Ser. No. 557,859
1 Claim. (Cl. 252—301.1)

ABSTRACT OF THE DISCLOSURE

A blanket fuel for a fast breeder reactor consisting of a paste of uranium mononitride particles having a median size no greater than 100 microns and a density of at least 8.0 g./cc. dispersed in sodium.

---

The invention described herein was made in the course of, or under a contract with the United States Atomic Energy Commission.

This application is a divisional of application Serial No. 477,981, filed on August 6, 1965, now Patent No. 3,287,093, issued November 23, 1966.

This invention relates to a nuclear reactor fuel material. In more detail the invention relates to a fluid blanket fuel for a sodium-cooled fast breeder nuclear reactor. In still more detail the invention relates to a paste fuel consisting of uranium mononitride particles dispersed in sodium.

Sodium coolant utilization is poor in the blanket of a solid-fuel fast breeder nuclear reactor because the heat generation rate in the blanket is higher at the end of irradiation than at the beginning and because the distribution of plutonium in the blanket is uneven. This inefficiency may be partially alleviated by shuffling fuel assemblies in the blanket; however, this is costly in downtime and does not completely solve the problem. On the other hand, fluid blanket fuels for fast breeder reactors show promise of improving utilization of the coolant and, thus, power conversion efficiency; of reducing reactor downtime for fuel shuffling; and of decreasing fuel processing and refabrication costs.

Solutions of uranium in a metallic solvent, uranium-based alloys, fused salt solutions containing uranium halides and slurries of a uranium compound dispersed in a liquid metal have all been suggested for use as a fluid blanket fuel for a fast breeder reactor. However, the solubility of uranium in metallic solvents is not high enough for a solution thereof to be useful as a fluid blanket fuel; uranium-based alloys have too high a melting point and are too corrosive to be practical; and fused salt solutions containing uranium halides have low uranium densities and are also corrosive.

Slurries of a uranium compound in a liquid metal, however, are a reasonably practical prospect for a fluid blanket fuel for a fast breeder reactor. In order to utilize as many neutrons as possible for breeding, the density of fertile material in the blanket should be as high as possible. In order to attain a high fuel density, a very dense slurry or "paste" incorporating a high solids to liquid ratio may be used and there has been a considerable body of work accomplished on paste fuels. A paste which is static or moves only slowly also avoids the particle comminution and container erosion problems which are inherent in fast flowing slurry systems. To date, paste fuels consisting of a dispersion of uranium dioxide in sodium or of uranium carbide in sodium have been suggested. However, both of these fuels suffer from rather serious disadvantages. For example, the fuel density attainable in a uranium dioxide paste is relatively low, the thermal conductivity of uranium dioxide is low, and a reaction between fissionable fuel and sodium vehicle to form corrosive sodium oxide is likely. Similarly, uranium carbide is difficult to prepare and handle and it is possible that carbon may transfer to the container via the sodium, causing the container to become embrittled.

It is accordingly an object of the present invention to develop a novel paste fuel for a nuclear reactor.

It is also an object of the present invention to develop a method of preparing said paste fuel.

These and other objects of the present invention are attained by preparing a dense settled paste of uranium mononitride in sodium. The paste fuel is prepared by forming metallic uranium into approximately one millimeter shot, turnings, or other finely divided dense material, nitriding the surface of the uranium at a temperature below the melting point of uranium, slowly increasing the temperature past the melting point of uranium, and nitriding the balance at a temperature above the melting point of uranium, thereby producing relatively void-free stoichiometric uranium mononitride bodies, pulverizing these bodies to form a powder consisting of dense particles of uranium mononitride, and mixing sufficient particles with sodium to form a settled paste. Such a fuel is advantageous because it has higher solids content than any other paste fuel known. Other advantages of the material are ease of preparation, good compatibility with stainless steel, high thermal conductivity, and resistance to sintering.

While the primary advantages of a fluid fuel are attained in a flowing system, it may also be desirable to employ a fluid fuel in a static system and a paste prepared in accordance with the present invention may be used in either a static or a flowing system.

Example

Uranium mononitride powder was prepared by reacting nitrogen with uranium shot at temperatures ranging from 800 to 1350° C. and subsequently grinding the product. The furnace for the nitridation reaction consisted of a 6-inch mullite ($3Al_2O_3 \cdot 2SiO_2$) combustion tube heated by silicon carbide heating elements. A uranium charge consisting of 300 to 1000 grams of −14 +25 mesh shot was placed in a tungsten crucible and heated in the furnace under a nitrogen atmosphere. The extent of reaction was followed semiquantitatively by recording the decrease in nitrogen pressure. Additional nitrogen was added intermittently to maintain a pressure between 200 and 500 millimeters of mercury during the reaction.

The following table gives the results of a number of test runs on the preparation of uranium mononitride.

NITRIDATION OF URANIUM SHOT

| Run No. | Time (hr.) at indicated temp. (° C.) | | | | Time to Evacuate[2] to 0.05 mm. Hg (hr.) | Chemical Analysis (w/o) | | Bulk Density (g./cc.) | Product Agglomeration (percent) |
|---|---|---|---|---|---|---|---|---|---|
| | 700–1,100[1] | 1,100–1,150 | 1,150–1,250 | 1,250–1,350 | | Nitrogen[3] | Oxygen | | |
| UN-4[1] | 0.5 | 0.1 | 0.6 | 7.0 | 0.3 | 5.50 | 0.10 | 7.1 | 70 |
| UN-6 | 5.0 | 0.1 | 0.4 | 1.8 | 1.5 | 5.51 | 0.15 | ---- | 20 |
| UN-7 | 9.0 | 0.1 | 2.0 | 0.3 | 2.7 | [4]5.35 | 0.048 | 5.8 | <5 |
| UN-9 | 3.1 | 0.3 | 2.7 | 1.3 | 1.3 | [5]4.73 | 0.04 | 6.5 | 30 |
| UN-10 | 2.1 | 0.3 | 2.4 | 2.5 | 1.6 | [6]2.8 | 0.6 | [6]7.3 | 40 |
| UN-11 | 1.3 | 0.7 | 1.0 | 7.2 | 0.3 | ---- | ---- | ---- | 0 |
| UN-13 | 1.8 | 0.7 | 1.0 | 1.3 | 0.3 | ---- | 0.44 | 7.9 | 0 |
| UN-14 | 1.3 | 0.6 | 1.8 | | 0.3 | [5]5.31 | 0.06 | 8.3 | 0 |

[1] Nitrogen added at 1,080° C. in UN-4; in other runs the nitrogen was added before heatup.
[2] The evacuation was done at 1,350° C. with the pressure eventually reaching about 10⁻¹ mm. Hg.
[3] Stoichiometric UN contains 5.55 w/o nitrogen.
[4] Nitrogen analysis believed to be erroneously low.
[5] Nitrogen analysis of sample of ground material.
[6] The very low nitrogen analysis indicates that the product contains free uranium; if true, this would affect the bulk density of the powder.

As shown in this table, the bulk density of the final product is a function of the time-temperature cycle employed during nitridation. In Runs UN-6, 7 and 9, in which the bulk of the nitridation (from the standpoint of time) took place below 1100° C., considerable time was required to evacuate the furnace tube at the end of nitridation, indicating evolution of nitrogen from the decomposition of higher nitrides. The bulk density of the products of these runs was low.

In Runs UN-4, 10, 11, 13 and 14, in which the bulk of the nitridation (from the standpoint of time) took place above 1150° C. and in which nitridation was completed at 1300 to 1350° C., the time required to evacuate the furnace tube at the end of a run was only 15 or 20 minutes, about the same as without a charge. This indicates that very little of the higher nitrides formed. The density of the product of these runs was comparatively high.

In some early runs a sizable fraction of the product was stitched together into a single agglomerate at the bottom of the crucible. Photomicrographs of the particles indicated that the stitching was caused by molten uranium leaking through the nitride skin formed on the uranium shot. However, this difficulty may be avoided by raising the temperature slowly from 1100 to 1150° C. through the melting point of uranium, and Runs UN-11, 13 and 14, wherein the temperature was raised at about 70° C. per hour, illustrate successful application of this principle.

The bulk density of the uranium nitride prepared in these runs is higher than that of the uranium nitride prepared by the standard procedure of nitriding bulk uranium at 800 to 900° C. and decomposing the higher nitrides thus formed under reduced pressure at 1100 to 1400° C. to obtain powdered uranium nitride with a bulk density of about 3 to 7 grams per cubic centimeter. (See Speidel, E. O. and Keller, D. L., Fabrication and Properties of Hot-Pressed Uranium Mononitride, BMI–1633, May 1963.)

It is believed that the reason for the increased density is that dense uranium nitride, rather than higher nitrides, is produced initially because of the presence of metallic uranium at the center of the shot. If reaction continues at a temperature of less than 1150° C., the formation of higher nitrides causes disruption of the face-centered cubic lattice structure of uranium mononitride, thereby creating voids. On the other hand, if the temperature is raised to above 1150° C. when the nitrogen-to-uranium ratio in the product is about 0.5 to 0.8 and to 1300° C. before the nitrogen-to-uranium ratio reaches 1.0, no higher nitrides are formed.

The nitrided product, which retained essentially the form of the original shot, was ground in a ball mill, usually for 24 hours, to a median size of 45 microns. It is essential that oxygen be excluded during grinding, since any oxidation that occurs has a serious effect on the density of the product; in fact, a much more serious effect than has oxygen present in the shot before grinding. Accordingly, grinding is carried out in a helium atmosphere. The bulk density of the uranium nitride powder thus formed is at least 8.0 grams per cubic centimeter which is higher than that found in the literature for any uncompacted ceramic uranium compound powder.

The dense uranium mononitride powder thus formed can then be mixed with sodium to form a paste. For example, powder obtained from Run 9A as described above was mixed with sodium at 300° C. to obtain 346 grams of paste containing 49 volume percent solids (6.6 grams of uranium per cubic centimeter). This paste was quite viscous and probably not suitable for a flowing system; however, it would be suitable for a static system. At an intermediate stage in the preparation of the paste when the paste contained 40% solids, the paste did have good flow properties and was suitable for a flowing system.

A dense uranium mononitride powder is a prerequisite for a satisfactory sodium-uranium nitride paste and the higher the density of the powder the higher the fuel content of the paste. Thus each step in the procedure described is of importance, and it is through this combination of steps that a high-fuel-content paste is prepared.

First, the uranium charge must be heated at a temperature below the melting point of uranium in an atmosphere of nitrogen for a time sufficient to form a skin of dense uranium mononitride on the uranium shot. Heating may be carried out at 700 to 1100° C. for one to two hours to convert 50 to 80% of the uranium to uranium mononitride. This is a key feature of the present invention, since prolonged heating at a temperature within this range results in the formation of the sesquinitride and ultimately a less dense form of uranium mononitride. Nitriding entirely at a temperature above the melting point of uranium is not feasible because a large bath of molten uranium would nitride very slowly. Formation of a skin of nitride on the uranium particles prior to melting prevents coalescence of the molten uranium into a single pool. The size of the bodies of uranium employed as the charge is also important. These bodies may be dense uranium shot having a particle size such as will pass a 14-mesh screen (U.S. Standard Series) or they can be uranium turnings having a thickness of about 20 mils or less. Larger shot or thicker turnings cannot be used because the nitridation reaction occurs too slowly. There is no apparent limit to how small the shot or how thin the turnings can be except that the material must be uranium in a dense form. A powder such as is obtained by hydriding uranium cannot therefore be employed because the bulk density of such a powder is low.

Secondly, the temperature at which the charge is heated must be gradually increased past the melting point of uranium to prevent the uranium from melting rapidly and bursting out of the uranium nitride skin formed on the shot. The rate of increase can be about 50 to 80 degrees per hour.

Thirdly, the temperature is increased to 1250 to 1350° C. which is maintained until the entire charge is nitrided. Three or four hours may be sufficient or it may take longer. The product of this reaction is uranium mononitride in a very dense form.

Fourthly, the uranium nitride bodies are ground to a median size of about 40 to 100 microns. The size of the particles is not critical except that the size distribution (the proportions of fine and coarse particles) would determine the volume fraction of uranium nitride which could be incorporated in the paste.

It will be appreciated that the experiments described in the above example were not performed with the thought in mind of developing optimum procedures and an optimum product but rather were performed merely to show operability of the process. Thus slight variations in the parameters mentioned in the specification may be desirable to obtain optimum results. For example, it is apparent that pastes with a higher uranium density or better flow characteristics could be prepared from denser uranium nitride powder and that such powder can be produced using the procedures outlined herein.

It will be understood that the invention is not to be limited to the details given herein but that it may be modified within the scope of the appended claim.

The embodiments of the invention in which an exclusive property or privilege is claimed are defined as follows:

A blanket fuel for a fast breeder reactor which consists of a paste of uranium mononitride particles dispersed in sodium wherein
 (a) the paste contains at least 40% solids,
 (b) the uranium mononitride has a density of at least 8 g./cc.,
 (c) the uranium mononitride is essentially free of higher nitrides, and
 (d) the uranium mononitride has a median particle size between 40 and 100 microns.

References Cited
UNITED STATES PATENTS

| | | | |
|---|---|---|---|
| 2,982,708 | 5/1961 | Abraham et al. | 176—89 |
| 3,122,509 | 2/1964 | Handwerk et al. | 176—89 |
| 3,169,117 | 2/1965 | Dickinson et al. | 176—89 |
| 3,170,843 | 2/1965 | Hammond | 176—18 |
| 3,178,259 | 4/1965 | Foster et al. | 23—347 |

OTHER REFERENCES

AEC documents: APDA-160, March 1964, pp. 1 and 4-9; BMI-1365, July 1959, pp. 1-4.

Nucleonics, September 1964, pp. 66-70.

L. DEWAYNE RUTLEDGE, *Primary Examiner.*